United States Patent
Kesavan et al.

(10) Patent No.: US 9,674,127 B2
(45) Date of Patent: *Jun. 6, 2017

(54) SELECTIVE MESSAGE REPUBLISHING TO SUBSCRIBER SUBSETS IN A PUBLISH-SUBSCRIBE MODEL

(71) Applicant: International Business Machines Corporation, Armonk, NY (US)

(72) Inventors: Sanjay M. Kesavan, Bangalore (IN); Rajesh Lalgowdar, Bangalore (IN); Sonali Samantaray, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/493,837

(22) Filed: Sep. 23, 2014

(65) Prior Publication Data

US 2016/0087922 A1    Mar. 24, 2016

(51) Int. Cl.
*G06F 15/16*     (2006.01)
*H04L 12/58*     (2006.01)
*H04L 29/08*     (2006.01)

(52) U.S. Cl.
CPC .............. *H04L 51/14* (2013.01); *H04L 51/08* (2013.01); *H04L 51/16* (2013.01); *H04L 51/30* (2013.01); *H04L 67/26* (2013.01)

(58) Field of Classification Search
CPC ....... H04L 67/2842; H04L 1/00; H04L 67/26; H04L 43/0817; H04L 67/28; H04L 43/10;
(Continued)

(56) References Cited

U.S. PATENT DOCUMENTS 6,772,396 B1 * 8/2004 Cronin ................ G06F 17/3089
345/629
7,886,180 B2    2/2011 Jin et al.
(Continued)

FOREIGN PATENT DOCUMENTS

EP    1528710 B1    6/2006

OTHER PUBLICATIONS

Pending U.S. Appl. No. 14/689,123, filed Apr. 17, 2015, entitled: "Selective Message Republishing to Subscriber Subsets in a Publish-Subscribe Model", pp. 1-27.
(Continued)

*Primary Examiner* — Arvin Eskandarnia
*Assistant Examiner* — Thao Duong
(74) *Attorney, Agent, or Firm* — Robert C. Bunker

(57) ABSTRACT

According to one exemplary embodiment, a method for selectively resending a first message in a publish-subscribe message distribution model is provided. The method may include receiving the first message having a first message ID associated with the first message. The method may include sending the first message to a plurality of subscribers. The method may include receiving a rolled back first message. The method may include determining if the first message ID matches a second message ID associated with a second message. The method may include creating a first subscriber list associated with the first message. The method may include storing the first message in a data structure. The method may include appending a second subscriber list associated with the second message with a subscriber. The method may include sending the second message to the first subscriber or the first message to the first subscriber.

10 Claims, 5 Drawing Sheets

(58) Field of Classification Search
CPC ....... H04L 67/10; H04L 67/327; H04L 51/14; H04L 1/0026; G06F 11/2097; G06F 9/542; G06F 9/546; G06F 11/00; G06F 11/2028; G06F 11/2038
See application file for complete search history.

(56) References Cited

U.S. PATENT DOCUMENTS

| | | | |
|---|---|---|---|
| 8,214,688 B1 * | 7/2012 | Watson | G06F 11/1443 714/18 |
| 8,489,674 B2 | 7/2013 | Srivastava et al. | |
| 8,521,906 B2 | 8/2013 | Reed et al. | |
| 2005/0021622 A1 * | 1/2005 | Cullen | G06Q 30/02 709/204 |
| 2006/0095524 A1 * | 5/2006 | Kay | G06Q 10/107 709/206 |
| 2008/0256553 A1 | 10/2008 | Cullen | |
| 2009/0271483 A1 | 10/2009 | Whitehead et al. | |
| 2012/0272252 A1 | 10/2012 | Beardsmore et al. | |
| 2014/0149516 A1 * | 5/2014 | Paulraj | H04L 51/08 709/206 |

OTHER PUBLICATIONS

IBM: List of IBM Patents or Patent Applications Treated as Related (Appendix P), dated Apr. 17, 2015, pp. 1-2.

Kazemzadeh et al., "Partition-Tolerant Distributed Publish/Subscribe Systems", 2011, 30th IEEE International Symposium on Reliable Distributed Systems, IEEE Computer Society, pp. 101-110.

\* cited by examiner

SELECTIVE MESSAGE REPUBLISHING TO SUBSCRIBER SUBSETS IN A PUBLISH-SUBSCRIBE MODEL

BACKGROUND

The present invention relates generally to the field of computing, and more particularly to electronic message distribution in a publish-subscribe model.

In messaging oriented middleware systems operating under a publish-subscribe model, there may be thousands of subscribers that are subscribed to a particular topic. When a publisher generates a message to be published to a topic, the messaging oriented middleware system may federate the message to all registered subscribers. As a subscriber tries to consume the message from the topic the subscriber is registered to, the subscriber may encounter problems processing the message. When the subscriber encounters a problem processing a message, the subscriber may rollback the message to the topic from which the message was received.

SUMMARY

According to one exemplary embodiment, a method for selectively resending a first message in a publish-subscribe message distribution model is provided. The method may include receiving the first message, whereby the first message has a first message identification (ID) associated with the first message. The method may also include sending the received first message to a plurality of subscribers. The method may then include receiving a rolled back first message from a first subscriber. The method may further include determining if the first message ID associated with the first message matches a second message ID associated with a second message, whereby the second message is stored in a data structure. The method may include creating a first subscriber list associated with the rolled back first message, whereby the first subscriber list includes a subscriber identifier corresponding with the first subscriber based on the determining that the first message ID does not match the second message ID. The method may also include storing the first message in the data structure based on the determining that the first message ID does not match the second message ID. The method may then include appending a second subscriber list associated with the second message to include the subscriber identifier associated with the first subscriber based on the determining that the first message ID matches the second message ID. The method may further include sending the second message to the first subscriber based on the appending the second subscriber list or the first message to the first subscriber based on the storing the first message in the data structure.

According to another exemplary embodiment, a computer system for selectively resending a first message in a publish-subscribe message distribution model is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the first message, whereby the first message has a first message identification (ID) associated with the first message. The method may also include sending the received first message to a plurality of subscribers. The method may then include receiving a rolled back first message from a first subscriber. The method may further include determining if the first message ID associated with the first message matches a second message ID associated with a second message, whereby the second message is stored in a data structure. The method may include creating a first subscriber list associated with the rolled back first message, whereby the first subscriber list includes a subscriber identifier corresponding with the first subscriber based on the determining that the first message ID does not match the second message ID. The method may also include storing the first message in the data structure based on the determining that the first message ID does not match the second message ID. The method may then include appending a second subscriber list associated with the second message to include the subscriber identifier associated with the first subscriber based on the determining that the first message ID matches the second message ID. The method may further include sending the second message to the first subscriber based on the appending the second subscriber list or the first message to the first subscriber based on the storing the first message in the data structure.

According to yet another exemplary embodiment, a computer program product for selectively resending a first message in a publish-subscribe message distribution model is provided. The computer program product may include one or more computer-readable storage devices and program instructions stored on at least one of the one or more tangible storage devices, the program instructions executable by a processor. The computer program product may include program instructions to receive the first message, whereby the first message has a first message identification (ID) associated with the first message. The computer program product may also include program instructions to send the received first message to a plurality of subscribers. The computer program product may then include program instructions to receive a rolled back first message from a first subscriber. The computer program product may further include program instructions to determine if the first message ID associated with the first message matches a second message ID associated with a second message, whereby the second message is stored in a data structure. The computer program product may include program instructions to create a first subscriber list associated with the rolled back first message, whereby the first subscriber list includes a subscriber identifier corresponding with the first subscriber based on the determining that the first message ID does not match the second message ID. The computer program product may also include program instructions to store the first message in the data structure based on the determining that the first message ID does not match the second message ID. The computer program product may then include program instructions to append a second subscriber list associated with the second message to include the subscriber identifier associated with the first subscriber based on the determining that the first message ID matches the second message ID. The computer program product may further include program instructions to send the second message to the first subscriber based on the appending the second subscriber list or the first message to the first subscriber based on the storing the first message in the data structure.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
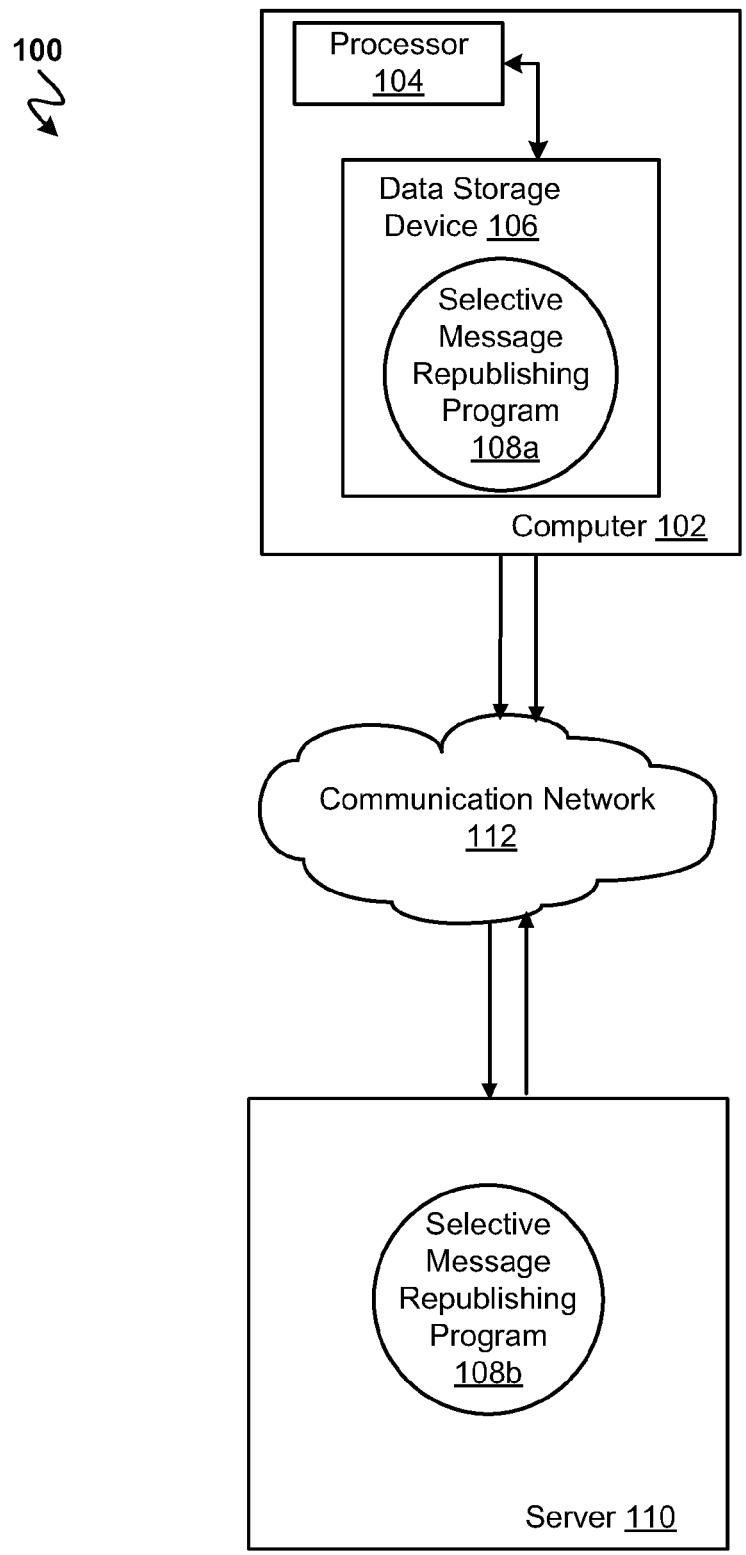
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for selectively republishing messages to a subset of subscribers in a publish-subscribe model.

As described above, in a typical publish-subscribe scenario with potentially thousands of subscribers, messages published to a topic (i.e., named logical channel) may be federated by a broker (i.e., message engine or messaging oriented middleware system) to all subscribers registered to the topic. Upon receiving a message from a topic, one or more subscribers may encounter problems processing the message (e.g., the application consuming the message may crash), causing the effected subscribers to rollback the message to the topic that the message originated from. After a predetermined amount of time, the broker may attempt to redeliver the message to the effected subscribers. If the subscriber fails to process the message after a predetermined number of attempts, the broker may determine that the message is a poison message (e.g., the message has errors). Poison messages may be rerouted to, and stored in, an exception destination maintained by the broker for special handling. The broker may then continue to publish subsequent messages from the topic to the subscriber so that the processing of messages does not stop.

Once messages may be sent to the exception destination, the messages may be added to an exception queue for a system administrator or a custom application to inspect and decide if the message should be discarded or republished. If a message from the exception queue is selected for republishing, the message may be republished to all subscribers registered to the topic the message originated from. While this may ensure republishing to subscribers that may have had trouble processing the message previously, the message may also be republished to subscribers that had successfully processed the message before and would now have to process the identical message again. Furthermore, the same message may be enqueued in the exception queue for each subscriber that encountered problems processing the message. Thus, the same message may be enqueued multiple times into the exception queue.

For example, if one hundred subscribers encounter problems processing the same message, one hundred copies of the same message may be enqueued into the exception queue. The one hundred message copies may then all be selected for republishing, resulting in the same message being sent to all subscribers one hundred times. In such scenarios, the resources dedicated to the exception queue may be overburdened. Furthermore, subscribers may have to process identical messages multiple times, unnecessarily wasting time and resources unless the subscribers implement complex custom filtering logic to analyze each incoming message to find and discard duplicate messages.

Subscribers may be classified as durable and non-durable subscribers. Durable subscribers are registered and assigned a unique identification whereby the durable subscriber's unique identifier continues to exist after the subscriber disconnects from messaging middleware (e.g., the durable subscriber's messaging application crashes). Messages to durable subscribers may be retained by the broker while the durable subscriber is not connected to the broker until the durable subscriber reconnects and consumes the message. A non-durable subscriber may not have a unique identification assigned and any messages sent to the non-durable subscriber may be discarded when the non-durable subscriber disconnects from the broker. Any time a non-durable subscriber connects to the messaging middleware, the non-durable subscriber may be treated by messaging middleware as a new subscriber.

Additionally, new subscribers that were not registered to a topic when a message was originally published may subscribe to the topic before republishing the message. Thus, new subscribers may erroneously receive a message that should have only been republished to the subscribers that were registered to the topic at the time the message was originally published.

Therefore, it may be advantageous to, among other things, provide a way for the broker to republish messages only to subscribers that were unable to successfully process the message previously and are entitled to receive the message.

According to one implementation of the present embodiment, the broker may assign a dynamic unique identifier (ID) to non-durable subscribers that may be valid for the lifecycle of the non-durable subscriber. The dynamic unique ID may be used by the broker to determine if a non-durable subscriber was registered to the topic at the time that a message being republished was originally federated to subscribers. Thus, the broker may be able to determine the subscribers that may be entitled to be sent the message out of all subscribers registered to a topic.

Additionally, the broker may assign a message ID to each message copy that is federated to subscribers, whereby each message copy may have the same message ID indicating that the messages are identical. The broker may then compare the message ID of any message being sent to the exception destination with the message IDs of the messages enqueued in the exception queue.

If the broker determines that a message enqueued in the exception queue has message ID that matches the message being sent to the exception destination, the broker may not enqueue the message sent to the exception queue in order to avoid duplicate messages in the exception queue. Instead of enqueuing a duplicate message in the exception queue, the broker may modify fields associated with the message already enqueued to indicate that another subscriber encountered problems processing the same message. The broker may increment a subscriber counter associated with the enqueued message to indicate that the total number of subscribers that encountered a problem processing the message has increased by one subscriber. Furthermore, a subscriber list associated with the enqueued message may be updated to include a subscriber identifier that may indicate the specific subscriber that encountered a problem processing the message. The broker may later selectively republish the message only to the subset of subscribers indicated in the subscriber list associated with the message. However, if the broker determines that there may not already be a message enqueued in the exception queue with the same message ID as the message being sent to the exception queue, the broker may enqueue the message into the exception queue.

By eliminating duplicate messages in the exception queue and only delivering messages to a subset of subscribers that encountered problems with the message, the broker may reduce resources wasted sending duplicate messages to subscribers that may have already successfully processed the message.

Referring now to FIG. 1, an exemplary networked computer environment 100 in accordance with one embodiment is depicted. The networked computer environment 100 may include a computer 102 with a processor 104 and a data storage device 106 that is enabled to run a selective message republishing program 108a. The networked computer environment 100 may also include a server 110 that is enabled to run a selective message republishing program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 5, server computer 110 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a selective message republishing program 108a and 108b may run on the client computer 102 or on the server computer 110. The selective message republishing program 108a and 108b may be used to republish messages exclusively to subscribers that were not able to process the messages previously. The selective message republishing program 108a and 108b is explained in further detail below with respect to FIGS. 2-4.

Figure 2:
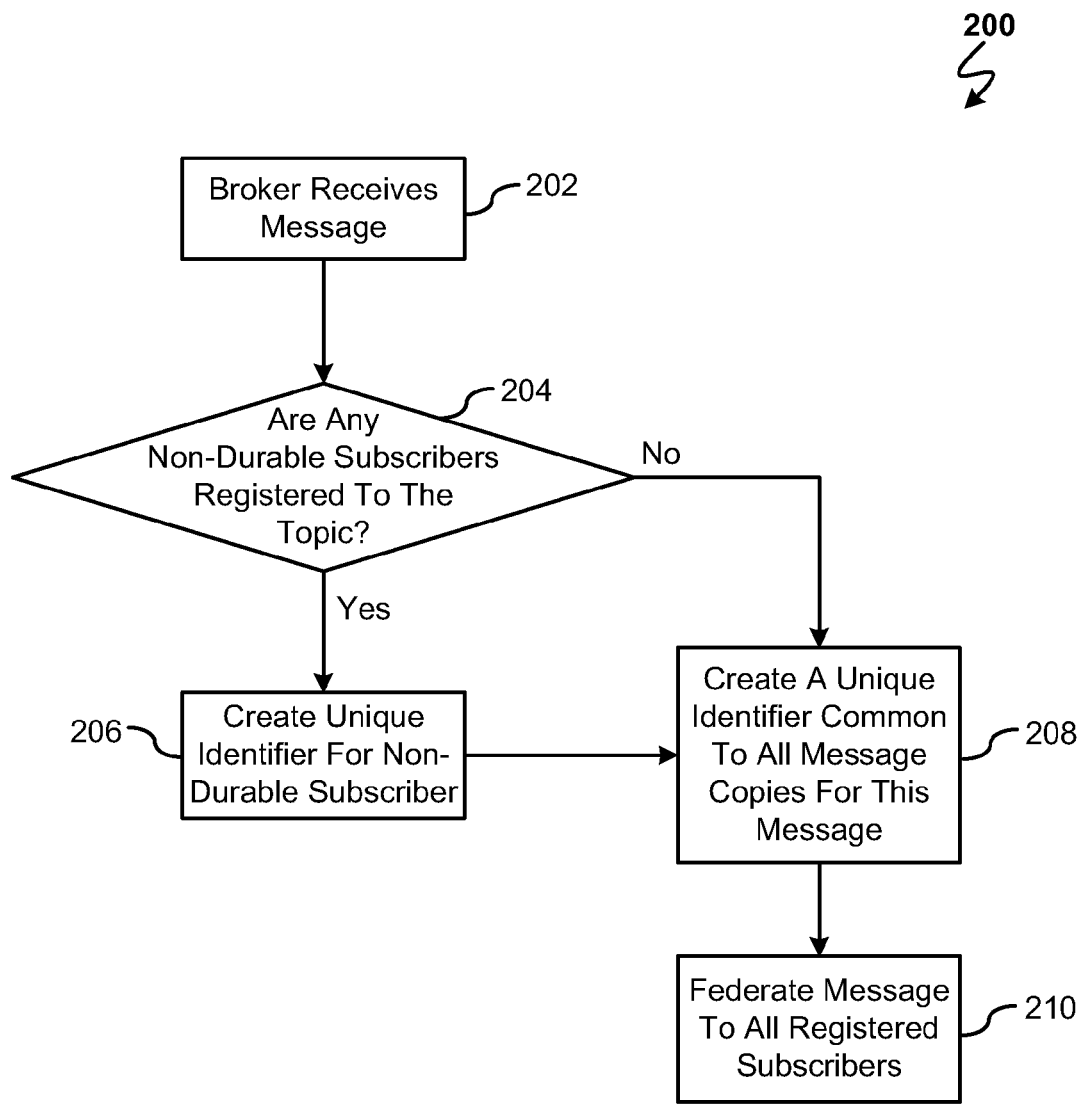
FIG. 2 is an operational flow chart illustrating a process a broker uses for managing message subscribers according to at least one embodiment.

Referring now to FIG. 2, an operational flow chart illustrating the exemplary subscriber management process 200 used by a broker (i.e., messaging oriented middleware) within the selective message republishing program 108a and 108b (FIG. 1) according to at least one embodiment is depicted.

Once a message is published to a topic by a publisher (i.e., message sender), the broker may receive the published message at 202 for federating (i.e., pushing) to the subscribers registered to the topic. Then, at 204, the broker may determine if there may be any non-durable subscribers registered to the topic that published the message. According to at least one embodiment, the broker may check a list of registered subscribers to the topic that may indicate whether each registered subscriber is a durable or non-durable subscriber. The broker may maintain the list of registered subscribers to the topic in a data repository, such as a database.

If the broker determines that there may be at least one non-durable subscriber to the topic at 204, the broker may create a dynamic unique identification (ID) indicator for each non-durable subscriber registered to the topic at 206. According to at least one embodiment, the dynamic unique ID created for each non-durable subscriber may be assigned to the non-durable subscriber for the lifecycle of the non-durable subscriber (e.g., until the non-durable subscriber disconnects from the messaging application). For example, the broker may determine that out of fifty subscribers to a topic, there are five non-durable subscribers. The broker then may create five different dynamic unique IDs, whereby one dynamic unique ID may be linked to one non-durable subscriber. The dynamic unique ID may be valid for the non-durable subscriber until the non-durable subscriber disconnects from the messaging application. In a scenario when a non-durable subscriber that has a dynamic unique ID disconnects and then subsequently reconnects to the messaging application, a new dynamic unique ID may be created and linked to the non-durable subscriber to replace the old dynamic unique ID.

However, if the broker determined that there may not be any non-durable subscribers at 204, or if all non-durable subscribers were linked to dynamic unique IDs at 206, the broker may then create a unique message ID that may be linked to all messages copies of the original published message at 208. According at least one embodiment, the broker may also record a timestamp corresponding to the time the message was created. For example, if a message may be published to a topic with ten subscribers, there may be ten copies of the message federated, one to each subscriber. Each of the ten messages may be assigned the same message ID to indicate that the messages are identical. The broker may also record a timestamp corresponding to the time the message was created. The broker may then store the message ID and corresponding timestamp in a data repository, such as a database, for retrieval later by the broker.

Next, at 210, the broker may federate copies of the message to all registered subscribers. According to at least one embodiment, the broker may federate the message, or a message reference, to all of the subscribers registered to the topic, both durable and non-durable. For example, if there are forty-five durable subscribers and five non-durable subscribers registered to a topic, the broker may federate fifty message copies to the fifty total registered subscribers.

Figure 3:
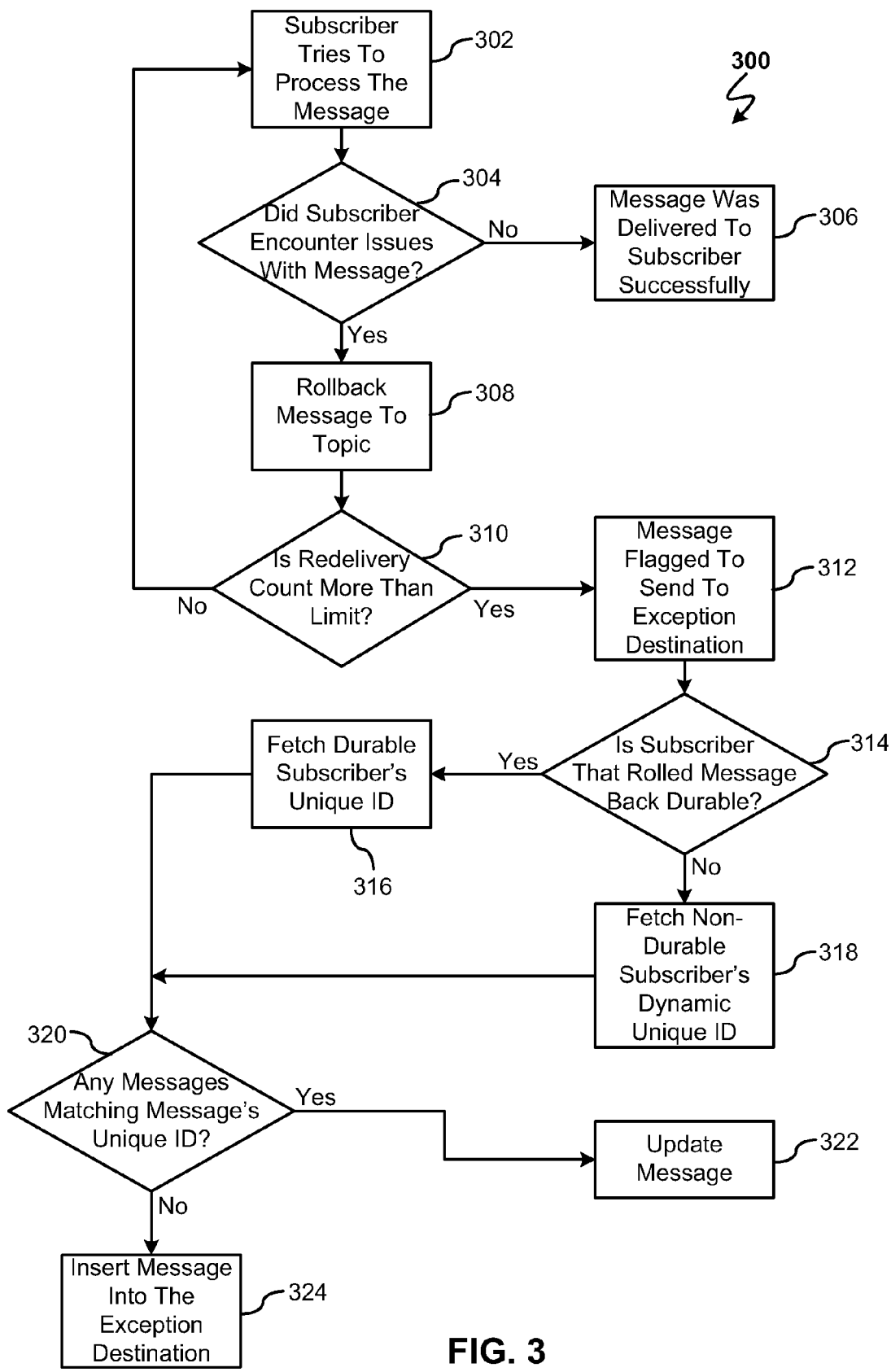
FIG. 3 is an operational flow chart illustrating a process a broker uses for message error handling according to at least one embodiment.

Referring now to FIG. 3, an operational flow chart illustrating the exemplary message error handling process 300 used by the selective message republishing program 108a and 108b (FIG. 1) according to at least one embodiment is depicted.

At 302, a subscriber may try to process a message federated to the subscriber by the broker. According to at least one embodiment, the broker may federate a message to a subscriber as described above with reference to FIG. 2. After receiving the federated message, the subscriber may then try to process and consume the message. For example, once a subscriber receives a message from the broker, the subscriber's messaging application may attempt to read the message and display the message to the subscriber.

Next, at 304, the message error handling process 300 may determine if the subscriber encountered any issues trying to process the message. For example, if the message developed internal errors while being federated, the message may not be processed properly by the subscriber. If the subscriber encountered no issues while processing the message at 304, the message error handling process 300 may determine that the message was processed and delivered to the subscriber successfully at 306.

However, if the subscriber encountered any issues processing the message at 304, the message may be rolled back to the topic at 308. According to at least one embodiment, a message that may not have been processed correctly may be sent back to the topic in order to attempt redelivery of the message. By rolling back the message to the topic, the message may be resent again later when the message may be processed correctly by the subscriber. After rolling back the message, a redelivery counter associated with the message may be incremented to indicate that the message may have been unsuccessfully processed. For example, a message may have a redelivery counter with the value of three indicating that the message has been processed unsuccessfully three times. If the subscriber encounters another issue while processing the message the next time the message is redelivered, the redelivery counter associated with the message may be incremented from three to four, to indicate that the message was unsuccessfully processed four times.

At 310, the message error handling process 300 may determine if the redelivery counter associated with the rolled back message exceeds a predefined count limit. According to at least one embodiment, the count limit may be defined by a system administrator. If the redelivery counter associated with the rolled back message exceeds the predefined count limit, the message may be flagged by the broker to send to the exception destination at 312. However, if the redelivery count does not exceed the predefined count limit, the message may be redelivered by the broker for the subscriber to process at 302.

For example, in a scenario when the predetermined count limit may be five, if the subscriber encountered issues trying to process a message that resulted in incrementing the message's redelivery count from four to five, the message may be redelivered by the broker to the subscriber again since the redelivery count does not exceed the predetermined count limit. If the subscriber encountered an issue once more while attempting to process the previously rolled back message, upon redelivery the associated redelivery count may be incremented from five to six. After comparing the message's current redelivery count (i.e., six) against the predetermined count limit (i.e., five), the broker may determine that the message may not be redelivered to the subscriber since the redelivery count exceeds the predetermined count limit. The broker may then flag the message to send to the exception destination since the redelivery count exceeded the predetermined count limit.

Next, at 314, the broker may determine if the subscriber that rolled the message back may be a durable subscriber. According to at least one embodiment, the broker may determine if the subscriber that rolled back the message may be a durable subscriber by searching a list of durable subscribers in a data repository, such as a database, for a unique ID that matches the subscriber. If the broker determines that the subscriber that rolled back the message may be a durable subscriber, the broker may fetch the unique ID corresponding with the durable subscriber at 316. Durable subscribers may have unique IDs created when the durable subscriber first registered with the broker that persists even if the durable subscriber disconnects (i.e., becomes inactive) from the broker. However, if the subscriber that rolled back the message may be determined to not be a durable subscriber (i.e., the subscriber may be non-durable), the broker may fetch the dynamic unique ID associated with the non-durable subscriber at 318 that may have been created previously as discussed above with reference to FIG. 2. Once the broker fetches the unique ID for a durable subscriber or the dynamic unique ID for a non-durable subscriber, the broker may store the subscriber identifier (i.e., unique ID or dynamic unique ID) in memory (e.g., random access memory) or in a data storage device (e.g., hard disk drive).

At 320, the broker may determine if any messages in the exception queue may have a message ID that matches the message ID of the rolled back message. According to at least one embodiment, the broker may check the messages in the exception queue for the presence of a message that may be identical to the message the rolled back message. The broker may determine that a message in the exception queue matches the rolled back message by comparing the message IDs of all messages in the exception queue with the message ID of the rolled back message.

If the broker determines that there may be a message in the exception queue with the same message ID as the rolled back message, the broker may update the message in the exception queue that matches the rolled back message at 322 instead of enqueuing the duplicate message to the exception queue. According to at least one embodiment, the broker may update the message already enqueued in the exception queue to include a reference to the subscriber that rolled back the message. Each message may have a subscriber count and a subscriber list associated with the message. The broker may update the subscriber count by incrementing the subscriber count by one to indicate that the message in the exception queue is identical to the message rolled back by the subscriber. Additionally, the broker may update the subscriber list associated with the message in the exception queue to include the subscriber identifier (e.g., the subscriber's unique ID or dynamic unique ID) corresponding with the subscriber that rolled back the message.

However, if the broker determines that no message enqueued in the exception queue matches the rolled back message, the rolled back message may be enqueued into the exception queue at 324. According to at least one embodiment, when the broker enqueues the message into the exception queue, the subscriber count associated with the message may be set to one and the subscriber list may be set to contain the subscriber identifier corresponding with the subscriber that rolled back the message.

Figure 4:
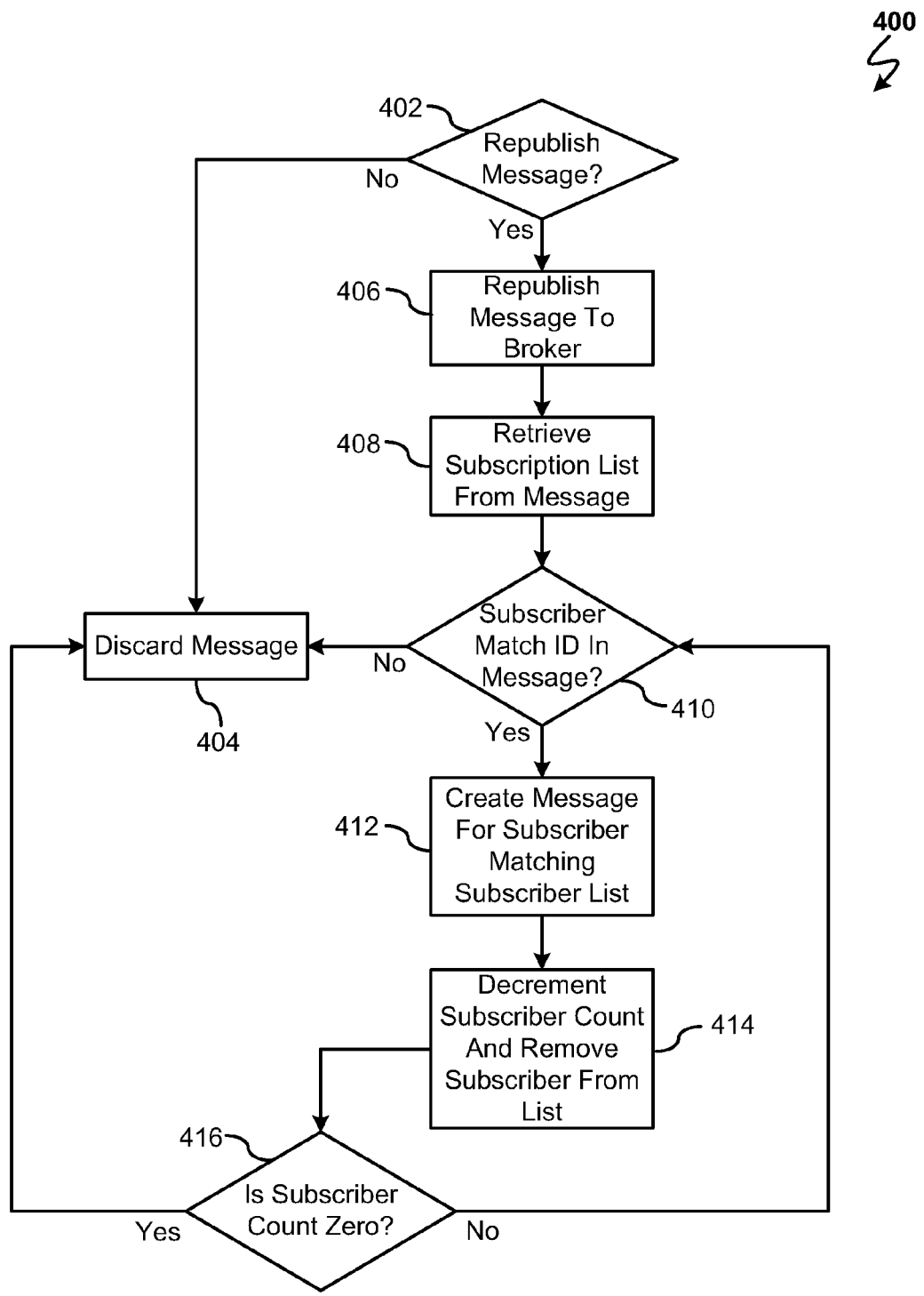
FIG. 4 is an operational flow chart illustrating a process a broker uses for selectively republishing messages to a subset of subscribers according to at least one embodiment.

Referring now to FIG. 4, an operational flow chart illustrating the exemplary selective republishing process 400 used by the selective message republishing program 108a and 108b (FIG. 1) according to at least one embodiment is depicted.

At 402, a message in the exception queue may be selected for republishing. According to at least one embodiment, a deciding entity (e.g., system administrator or a custom application) may review a message at the top of the exception queue to determine if the message merits republishing after a predefined amount of time. For example, if the message at the top of the exception queue contains business critical information, a system administrator may determine that the message should be republished to a subscriber once the predetermined amount of time has passed.

If the deciding entity determines that the message at the top of the exception queue may not need to be republished, the message may be dequeued from the exception queue and discarded at 404. However, if the deciding entity determines that the message at the top of the exception queue should be republished, the message may be republished to the broker at 406. According to at least one embodiment, the message may be republished to the broker with an associated republish flag set to indicate that the message may be selectively republished by the broker to a subset of subscribers.

Next, at 408, the broker may retrieve the subscriber list associated with the message. According to at least one embodiment, if the broker receives a message with a republish flag set, the broker may retrieve the subscriber list associated with the message to determine the subscriber subset to send the message.

Then, at 410, the broker may search for a subscriber having a subscriber identifier that matches a subscriber identifier contained in the subscriber list associated with the message. If the broker is unable to find at least one subscriber with a corresponding subscriber identifier matching one of the subscriber identifiers listed in the subscriber list associated with the message, the broker may dequeue the message from the exception queue and discard the message at 404. According to at least one embodiment, if the broker is unable to find at least one subscriber referenced in the subscriber list, the message may no longer have any valid recipients, and thus the message may be discarded.

However, if the broker found a subscriber that matches a subscriber identifier in the subscriber list, the broker may create a copy of the message to federate to the subscriber previously identified in the subscriber list associated with the message at 412. According to at least one embodiment, after the broker creates a copy of the message, the broker may also federate the message to the subscriber corresponding to the subscriber identifier found in the subscriber list associated with the message.

Next, at 414, the broker may decrement the subscriber counter and also remove the subscriber identifier corresponding to the subscriber found in the subscriber list associated with the message. Then, at 416, the broker may check if the subscriber count associated with the message may have the value of zero. If the subscriber count associated with the message has the value of zero, the message may be dequeued from the exception queue and discarded at 404. However, if the subscriber count has a value greater than zero, the broker may check the subscriber list associated with the message for another subscriber that matches a subscriber identifier in the subscriber list at 410.

Figure 5:
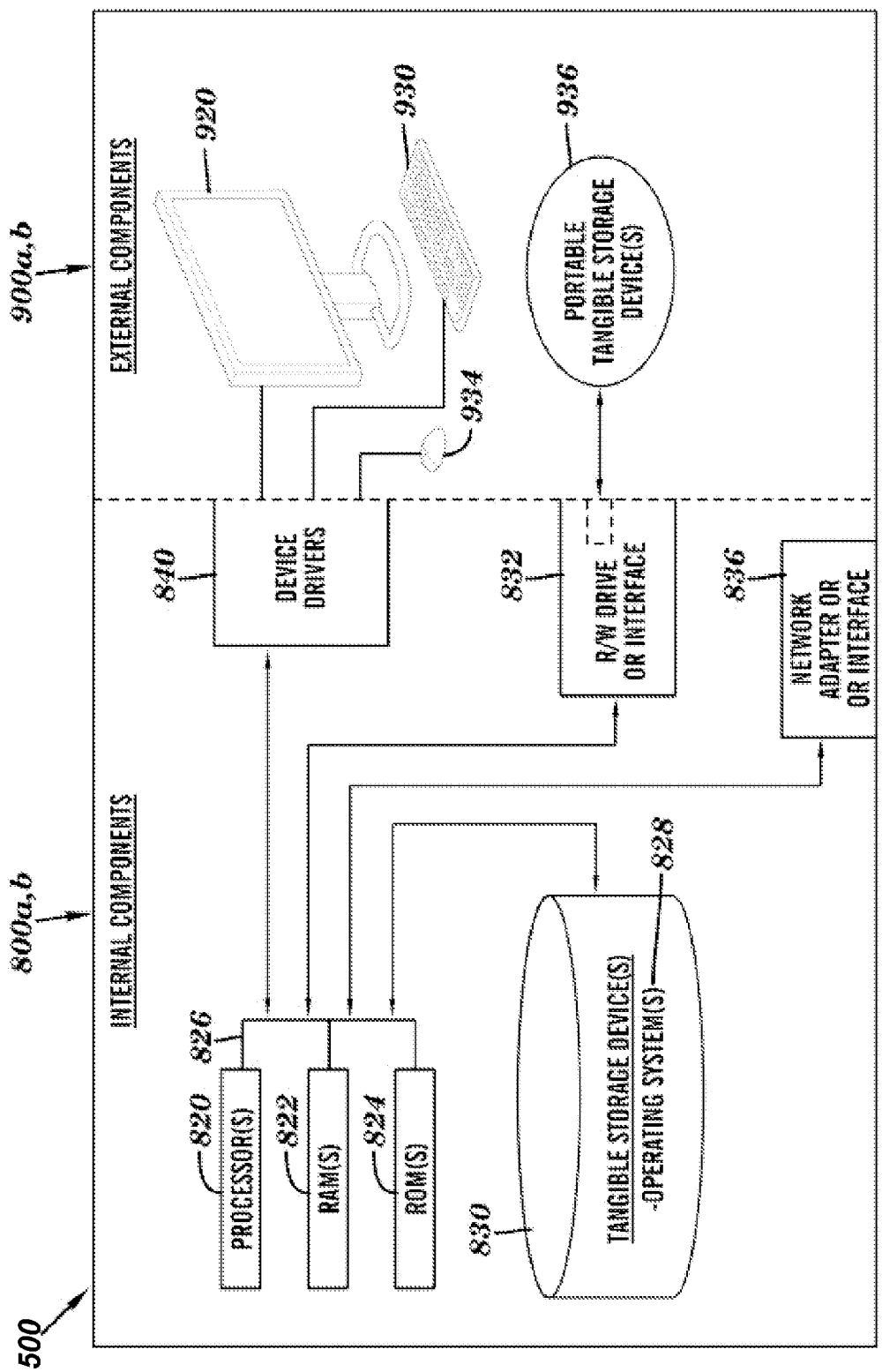
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 800 *a, b* and external components 900 *a, b* illustrated in FIG. 5. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a selective message republishing program 108*a* and 108*b* (FIG. 1), may be stored on one or more computer-readable tangible storage devices 830 for execution by one or more processors 820 via one or more RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. The selective message republishing program 108*a* and 108*b* (FIG. 1) can be stored on one or more of the respective portable computer-readable tangible storage devices 936, read via the respective R/W drive or interface 832 and loaded into the respective hard drive 830.

Each set of internal components 800 *a, b* may also include network adapters (or switch port cards) or interfaces 836 such as a TCP/IP adapter cards, wireless wi-fi interface cards, or 3G or 4G wireless interface cards or other wired or wireless communication links. The selective message republishing program 108*a* (FIG. 1) in client computer 102 (FIG. 1) and the selective message republishing program 108*b* (FIG. 1) in network server computer 110 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the selective message republishing program 108*a* (FIG. 1) in client computer 102 (FIG. 1) and the selective message republishing program 108*b* (FIG. 1) in network server computer 110 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for selectively resending a message in a publish-subscribe message distribution model, comprising:
    one or more processors, one or more non-transitory computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving the message;
    determining that at least one subscriber within a plurality of subscribers is a non-durable subscriber;
    generating a dynamic unique ID for the non-durable subscriber, wherein the generated dynamic unique ID is valid for a lifecycle associated with the non-durable subscriber;
    generating a message ID for the received message, wherein the generated message ID is assigned to the received message;
    sending the received message to the plurality of subscribers;
    receiving a rolled back message from a subscriber within the plurality of subscribers;
    incrementing a redelivery counter associated with the received rolled back message;
    resending the rolled back message to the subscriber based on determining the redelivery counter does not exceed a count limit;
    enqueuing the received rolled back message in a data structure based on determining the redelivery counter exceeds the count limit and based on determining that no message enqueued in the data structure has an ID matching the message ID of the received rolled back message;
    creating a republish list associated with the enqueued rolled back message in response to enqueuing the enqueued rolled back message;
    adding a subscriber ID associated with the subscriber to the republish list based on determining the redelivery counter exceeds the count limit;
    determining that the enqueued rolled back message should be resent;
    retrieving the republish list associated with the rolled back message based on determining that the enqueued rolled back message should be resent;
    determining when a subscriber ID matches a subscriber ID in the retrieved republish list;
    creating a message copy based on the rolled back message for a subscriber associated with the subscriber ID in the retrieved republish list;
    sending the created message copy to the subscriber associated with the subscriber ID;
    removing the subscriber ID from the retrieved republish list; and
    dequeuing the rolled back message from the data structure based on determining that there are no remaining subscriber IDs in the retrieved republish list.

2. The computer system of claim 1, further comprising:
    resending the rolled back message to the subscriber a predetermined number of times.

3. The computer system of claim 1, wherein the receiving the rolled back message from the subscriber comprises the subscriber encountering an issue attempting to process the message and rolling back the message.

4. The computer system of claim 1, wherein the data structure comprises an exception queue.

5. The computer system of claim 1, wherein the subscriber has an identifier that is valid until the subscriber disconnects from a messaging oriented middleware system.

6. A computer program product for selectively resending a message in a publish-subscribe message distribution model, comprising:
    one or more non-transitory computer-readable storage medium and program instructions stored on at least one of the one or more tangible storage medium, the program instructions executable by a processor, the program instructions comprising:
    program instructions to receive the message;
    program instructions to determine that at least one subscriber within a plurality of subscribers is a non-durable subscriber;
    program instructions to generate a dynamic unique ID for the non-durable subscriber, wherein the generated dynamic unique ID is valid for a lifecycle associated with the non-durable subscriber;
    program instructions to generate a message ID for the received message, wherein the generated message ID is assigned to the received message;
    program instructions to send the received message to the plurality of subscribers;
    program instructions to receive a rolled back message from a subscriber within the plurality of subscribers;
    program instructions to increment a redelivery counter associated with the received rolled back message;
    program instructions to resend the rolled back message to the subscriber based on determining the redelivery counter does not exceed a count limit;
    program instructions to enqueue the received rolled back message in a data structure based on determining the redelivery counter exceeds the count limit and based on determining that no message enqueued in the data structure has an ID matching the message ID of the received rolled back message;
    program instructions to create a republish list associated with the enqueued rolled back message in response to enqueuing the enqueued rolled back message;

program instructions to add a subscriber ID associated with the subscriber to the republish list based on determining the redelivery counter exceeds the count limit;

program instructions to determine that the enqueued rolled back message should be resent;

program instructions to retrieve the republish list associated with the rolled back message based on determining that the enqueued rolled back message should be resent;

program instructions to determine when a subscriber ID matches a subscriber ID in the retrieved republish list;

program instructions to create a message copy based on the rolled back message for a subscriber associated with the subscriber ID in the retrieved republish list;

program instructions to send the created message copy to the subscriber associated with the subscriber ID;

program instructions to remove the subscriber ID from the retrieved republish list; and program instructions to dequeue the rolled back message from the data structure based on determining that there are no remaining subscriber IDs in the retrieved republish list.

7. The computer program product of claim 6, further comprising:

program instructions to resend the rolled back message to the subscriber a predetermined number of times.

8. The computer program product of claim 6, wherein the receiving the rolled back message from the subscriber comprises the subscriber encountering an issue attempting to process the message and rolling back the message.

9. The computer program product of claim 6, wherein the data structure comprises an exception queue.

10. The computer program product of claim 6, wherein the subscriber has an identifier that is valid until the subscriber disconnects from a messaging oriented middleware system.

* * * * *